(12) United States Patent
Hu

(10) Patent No.: US 10,817,285 B1
(45) Date of Patent: Oct. 27, 2020

(54) TRANSACTIONAL MIGRATION SYSTEM

(71) Applicant: SAP SE, Walldorf (DE)

(72) Inventor: Dongqing Hu, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/537,939

(22) Filed: Aug. 12, 2019

(51) Int. Cl.
*G06F 8/76* (2018.01)
*G06F 9/48* (2006.01)

(52) U.S. Cl.
CPC .............. *G06F 8/76* (2013.01); *G06F 9/4875* (2013.01); *G06F 9/4881* (2013.01)

(58) Field of Classification Search
None
See application file for complete search history.

(56) References Cited

U.S. PATENT DOCUMENTS

| | | | | |
|---|---|---|---|---|
| 6,691,298 | B1 * | 2/2004 | Russo | G06F 9/5016 711/170 |
| 2005/0010609 | A1 * | 1/2005 | Katoh | G06F 21/6218 |
| 2014/0130023 | A1 * | 5/2014 | Chen | G06F 8/41 717/140 |
| 2015/0356582 | A1 * | 12/2015 | Turner, Jr. | H04W 4/029 705/7.34 |
| 2017/0139788 | A1 * | 5/2017 | Hurri | G06F 11/203 |
| 2018/0121293 | A1 * | 5/2018 | Phillips | G06F 11/1451 |

* cited by examiner

*Primary Examiner* — Philip Wang
(74) *Attorney, Agent, or Firm* — Sterne, Kessler, Goldstein & Fox P.L.L.C.

(57) ABSTRACT

Disclosed herein are system, method, and various embodiments for migrating a program from a first device to a second device. An embodiment operates by receiving a playbook comprising a source location of source code on the first device and a target location for the source code on the second device. An execution function for transferring the source code from the first device to the second device is determined. A set of classes on the first device to which to apply the playbook are identified. At least one internal reference and at least one external reference in the set of classes are updated. The set of classes are migrated from the source location on the first device to the target location on the second device based on the playbook. The at least one internal reference is updated after the migration, wherein the program is executable using the migrated classes after the updating.

20 Claims, 3 Drawing Sheets

TRANSACTIONAL MIGRATION SYSTEM

CROSS-REFERENCE TO RELATED APPLICATIONS

This application is related to U.S. patent application Ser. No. 16/214,689 "Semantic-aware and self-corrective re-architecting system" to Dongqing Hu, filed on Dec. 12, 2018, which is hereby incorporated by reference in its entirety.

BACKGROUND

Migrating a program often involves moving or transferring code from one system or device to another system or device. Code or program migration however is not a simple copy and paste command because often times the code of the program being migrated will have many dependencies and references between various portions of the code. Also, depending on the size and/or complexity of the program being migrated, the entire program may not be able to be moved in a single migration.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a transactional migration system.

Figure 1:
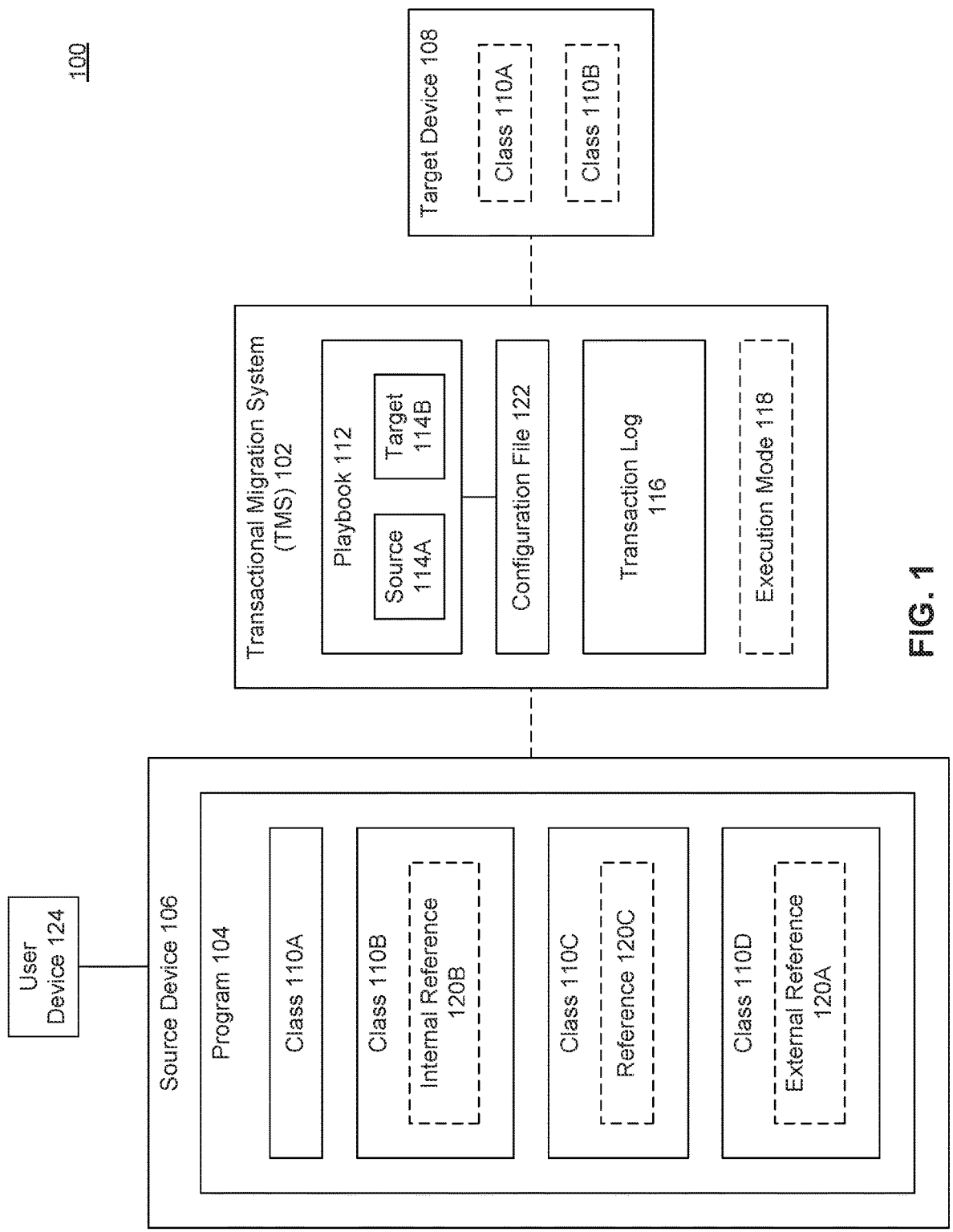
FIG. 1 is a block diagram illustrating example functionality for providing a transactional migration system (TMS), according to some embodiments.

FIG. 1 is a block diagram 100 illustrating example functionality for providing a transactional migration system (TMS) 102, according to some embodiments. TMS 102 may enable the movement, transfer, or migration of a program 104, including portions of code of the program 104, between different computing systems.

In an embodiment, a developer may want to migrate program 104 (or a portion thereof) from a first system or source device 106 to a second system or target device 108. The code may be migrated for any different number of reasons. For example, the developer may want to upgrade or change the hardware on which the program is executing. TMS 102 may enable or support the migration of program 104, or portions thereof, from a source device 106 to a target device 108.

The devices 106, 108 may include any computing systems, computing devices, laptops, servers, software modules, database systems, virtual machines, or group of multiple machines, to name just some examples. In a system embodiment, the devices 106, 108 may each include multiple computing devices each of which store, execute, or make available a portion or instance of program 104. The system may include multiple physical computing machines and/or virtual machines that are communicatively coupled to at least one or other machine of the respective system 106, 108.

In an embodiment, program 104 may include a number of portions or subsections of executable files, libraries, code 110, etc., which may be moved or migrated individually or together from source device 106 to target device 108. In the example illustrated, these program portions are referred to as classes 110. Classes 110 may include object-oriented classes, libraries, data structures, or other code portions that may be configured to provide a portion of the functionality of program 104 (including sending or receiving data).

In the example illustrated, a developer or administrator may want to migrate class 110A and class 110B from source device 106 to target device 108. TMS 102 may provide a framework by which to perform the migration. In an embodiment, TMS 102 may enable a partial migration of class 110A and class 110B during an initial migration period, and then a migration of class 110C and/or 110D at later migration times.

TMS 102 may perform or execute the migration of classes 110 of program 104 based on a playbook 112. Playbook 112 may include a compilable or compiled code file that defines what portions of program 104 are to be moved or migrated. In an embodiment, playbook 112 may include a source information 114A and a target address 114B. Source 114A and target 114B may include network or local addresses of the names and locations where particular files, code, or classes 110 are stored (source 114A) and are to be migrated (target 114B).

In an embodiment, playbook 112 may use a declarative programming structure, thus enabling a user or developer to specify what needs to be accomplished or migrated without specifying all of the details and code as to how to achieve the goal. For example, TMS 102 may include a preconfigured migrate function that takes two parameters: source 114A and target 114B. However the playbook 112 may be written by the developer in a domain specific language (DSL), relevant to program 104.

Example DSLs include, but are not limited to JAVA/JVM (JAVA virtual machine), KOTLIN, and SCALA. This may enable developers invoke DSL functions in conditional branches, loops and user-defined functions to maximize expressivity in playbook 112. Invoking a DSL function does not mean the underlying operation is executed immediately when playbook 112 is executed. By using orchestration, TMS 102 may defer the execution of certain playbook functions to maximize or improve resource utilization.

TMS 102 thus may enable a developer to design a playbook calling the migrate function and providing the two parameters. Using the migrate function or playbook 112 may simplify the migration process for a developer or administrator seeking to migrate program 104 by reducing the amount of code required to perform the migration. For example, playbook 112 may enable the usage of a preconfigured, pre-debugged, and precompiled function which may save system resources and code generation time that would otherwise be required by a developer writing a migration function from scratch for each class to be migrated.

Source 114A may indicate where on source device 106 a class 110A to be migrated is stored, and target 114B may indicate a destination address on target device 108 where class 110A is to be migrated. In an embodiment, target 114B may further enable the class 110A to be renamed in the target location or address. The addresses may include a file or directory structured addresses or network addresses, including a file or class name.

In an embodiment, a user may also specify an execution mode 118 associated with a particular playbook 112. The execution mode 118 may specify what migration function(s) are to be performed with regard to the specified classes or files of playbook 1112. Example execution modes 118 include move, copy, update, move-update, and copy-update.

Move may include a command to move one or more files or classes 110 from source device 106 to target device 108. The result of the move execution mode 118 is that a class 110 is deleted from source device 106 (or assigned for garbage collection), and is copied onto target device 108 at target address 114B.

Copy may include a command to copy one or more files or classes 110 from source device 106 to target device 108. The result of the copy execution mode 118 is that a class 110 that is copied exists both on source device 106 and target device 108 simultaneously.

Update may include a command that requests an update of references 120. References 120 may be calls or references from one class 110 to another class 110. References 120 may include import functions, function calls, library calls, etc. An internal reference 120B may be a reference to another class 110 that is being migrated from a source device 106 to a target device 108 during a particular or current migration session. For example, a call or reference from class 110B to class 110A may be an internal reference 120B since both classes 110A, 110B are being moved in the example migration illustrated in FIG. 1.

An external reference 120A may be a reference by or from a not-moved class (that is not being migrated during the current migration session) to a moved class (e.g., a class that that is being migrated during the current migration session. For example, class 110D may include an external reference 120A to class 110A, if the class 110D is being moved in a different migration session than class 110A, or if class 110D is not being moved all. Or, a reference from class 110A may be an external reference if it points to class 110B, if they are moved during different migration sessions. In an embodiment, any class 110 may include multiple external references 120A to different classes being moved during different migration sessions.

In another embodiment, external reference 120A may call or include a call from an address of another device, program, or network location that is not directly associated with the migration of program 104. Reference 120C may be either an internal reference 120B or an external reference 120A.

In the example shown, the various classes 110A-C each include a single reference 120A-C, however in other embodiments, the classes 110 may include any different number or combinations of references 120. In an embodiment, TMS 102 may identify internal references 120B from playbook 112, or by scanning the code or headers of the classes 110A, 110B that are identified as being part of the migration.

In update mode 118, TMS 102 may update the various identified internal references 120B. The update of internal references 120B may include or account for any renamed functions within playbook 112. For example, if internal reference 120B references class 110A, and class 110A is migrated and its name is changed, then an update of internal reference 120B may include pointing to the new name and address of class 110A. In an embodiment, any external references 120A may also be updated as part of the migration process to reflect or point to the new locations of the moved classes 110.

Internal reference 120B may be a migrated class that references another migrated class. External reference 120A may be a non-migrated class that references a migrated class. In an embodiment, a non-migrated class during a first migration, may later be a migrated class and moved during a second, later migration.

In an embodiment, TMS 102 may include one playbook 112 and multiple or various modes of operation or execution. In modes that moving or copying (e.g., move, copy, move-update, and copy-update), internal references 120B may be updated because the migrated classes should remain consistent in being able to reference one another, while external references 120A may remain pointing to older locations. In a move or copy mode without update, external references 120A are not updated. In an update mode, external references 120A may be updated. The chart below summarizes various modes of operation of TMS 102, according to an example embodiment:

| Modes | Internal References | External References |
| --- | --- | --- |
| move | Updated | Not updated |
| copy | Updated (in the copy, not the origin) | Not updated |
| update | Not updated | Updated |
| move-update | Updated | Updated |
| copy-update | Updated (in the copy, not the origin) | Updated |

In an embodiment however, TMS 102 may track the various references 120 in both their original and updated state in a transaction log 116. Transaction log 116 may include a tracking of all the migration actions taken with regard to migrating a program 104, or portions thereof, from one location to another across one or more migration sessions.

A playbook 112 may include various migration commands including but not limited to creating, modifying, renaming, or deleting files using a DSL. TMS 102 may assign each command a transaction identifier (ID) and record the command and transaction ID in transaction log 116. Thus TMS 102 may enable rollback of any migration transaction.

In an embodiment, TMS 102 may enable two different rollback modes. TMS 102 may perform automatic rollback on failures. For example, when an error stops the execution, all changes of current transaction are rolled back automatically. TMS 102 may also support the manual rollback of committed transactions. For example, even if a transaction has been committed, the user can still execute a command to rollback committed changes. In an embodiment, if 3 transactions are committed in sequence [1, 2, 3] without any other change interfering or occurring in between, they can be rolled back in reverse sequence [3, 2, 1]. However, if a user changed a line of code between transactions 2 & 3, the correctness of rolling back 3 is not guaranteed.

Transaction log 116 may include a persistent tracking that enables a user to selectively rollback executed migration functions at any time in the migration process. This may be in contrast to an integrated development environment for migration, which may enable in-session rollback of certain functions, but lack persistency. Using an integrated development environment, a user may not be able to roll back previous migration changes (e.g., which occurred during a previous migration session or instance of the integrated development environment).

As just referenced, transaction log 116 may include a list of references 120 from the migrated functions or classes 110. Upon receiving update commands, TMS 102 may identify and update the references 120 in the previously migrated and currently migrated classes 110. For example, during a first migration period or session classes 110A and 110B may be migrated to target device 108. External reference 120A may call class 110A, which is updated during the first migration period. Then, during a second time, when class 110D is migrated from source device 106 to target device 108 or another device or storage location, TMS 102 may not need to update the previously updated external reference 120A that is already pointing to the new location of the previously migrated class 110A.

In an embodiment, TMS 102 may identify and track all of the references 120 across all of the classes 110 of program 104, including both migrated and non-migrated classes. Or, for example, the developer may provide a list of classes 110 across which references 120 are to be tracked by TMS 102. Then for example, if reference 120C is a reference to class 110B which is being migrated, even though class 110C is not being migrated, the reference 120C may be updated to point to the new location of class 110B on target device 108.

In an embodiment, a user or developer may provide a configuration file 122. Configuration file 122 may include an indication of the location of the various classes 110 or other system or program code on source device 106. TMS 102 may then use configuration file 122 to scan the various classes 110 to identify the references 120.

In an embodiment, program 104 may be a live program being accessed by one or more user devices 124. Upon the migration of program 104 from source device 106 to target device 108, the user devices 124 may be re-directed to target device 108. In an embodiment, a portion of program 104 may be executing on target device 108, while another portion is executing on source device 106, without any change to the user experience of program 104 from user device 124.

TMS 102 may guarantee ACID (atomicity, consistency, isolation, durability) properties in performing the migration transactions required to migrate classes 110 from source device 106 to target device 106. Thus, TMS 102 may enable the migration while maintaining, maximizing, or improving the uptime or availability of program 104 during and through the migration process.

Atomicity may refer to an all or nothing transaction committal process. For example, if a failure happens during the migration, TMS 102 may stop the execution, and roll back the incomplete changes using transaction log 116.

TMS 102 may guarantee consistency for each code change. For example, TMS 102 may guarantee all related codes in the workspace are updated accordingly. TMS 102 may also guarantee isolation via serializability. For example, TMS 102 may lock a file to prevent multiple concurrent executions on a workspace. If users want to execute multiple playbooks 112 at the same time, TMS 102 may enable workspace replication. TMS 102 may also guarantee durability such that all code changes and the transaction log 116 are saved to disk.

By simplifying what is required from a developer in generating a playbook 112, TMS 102 alleviates problems with convention migration systems such as steep learning curves, unreadable code, unmanaged intermediate states, and inconsistent failure states. For example, the same playbook 112 may be used to migrate or modify hundreds, or even thousands of classes 110.

In an embodiment, TMS 102 may incorporate orchestration and transaction management in executing the domain specific language of playbook 112. Through orchestration, TMS 102 may execute multiple migration actions or transactions in one play or execution session. Through performing transaction maintenance, TMS 102 may track each of these actions or transactions in transaction log 116 and enables rollback at any time.

In an embodiment, in executing a playbook 112, TMS 102 may load configuration details, load pathways, initialize a runtime context, execute the playbook body, and execute post-migration hooks. These post-migration hooks may be callbacks added by the playbook author to define some post-migration operations e.g. custom integration, cleanup, or reporting. TMS 102 may then report the results and commit the transaction.

In providing or modifying code for playbook 112, TMS 102 may enable or perform code changes using any combination of three different coding or abstraction techniques, which include text-based code changes, syntax-based code changes, and semantics-based code changes. There are different advantages to each strategy, TMS 102 provides flexibility in allowing a developer or TMS 102 to use the most suitable approach.

In a text-based approach, TMS 102 may replace the class's qualified name in every code file when moving files. In a syntax-based approach, TMS 102 may move or rename files, by identifying and replacing the references 120 of the class 110 in every code file. In a semantics-based approach, TMS 102 may employ an interface change adoption by identifying and modifying the invocations of the interface's function/method. In an embodiment, this may cause TMS 102 to perform semantic analysis, because the invocation is contextualized. There is no one best strategy, TMS 102 however may employ any strategy based on migration tasks of playbook 112.

Using orchestration, TMS 102 connects and reorders the operations, and improves the flow of transactions of playbook 112. For example, if 100 classes are migrated (e.g. moved or renamed) in one playbook 112, they can be classified by TMS 102 as a group. As class can reference 120 other classes and the references 120 among these classes are seen as internal references 120B, while references from the non-migrated classes are seen as external references 120A (that are pointing to migrated classes).

As a solution, TMS 102 will not update internal references 120B when migrating the classes of the group, but instead the internal references 120B will be updated after migrating these classes. In doing so, TMS 102 automatically defers particular transactions or operations of playbook 112.

In an embodiment, classes 110 may include inheritance or sub-classes, such that one class inherits the properties of another class. TMS 102 may record, in transaction log 116, which classes are moved or migrated. As such, if an inherited class was migrated or moved by a previous migration operation, TMS 102 avoids issuing errors indicating that the inheritance target is missing.

In recording transactions in transaction log 116, TMS 102 may also prevent failures or errors that may occur when a developer or user tries to migrate a class that already been migrated during a previous migration session. In an embodiment, TMS 102 may maintain a hash map recording the from-paths (e.g., source 114A) and to-paths of moves and renames (e.g., target 114B).

When executing a copy or move a file command, TMS 102 may check and make sure that there is enough storage space on the target device 108 to store the file. If not, TMS 102 may create space on the disk if there is none. If no space can be created, an error to the user may be issued alerting the user to the issue. TMS 102 may also generate and assign a new transaction ID to the migration command.

TMS 102 may then execute the transaction and record it in the transaction log 116. In an embodiment, if a new file is created, transaction log 116 may include a separate section for newly created files. If the transaction is a modification or deletion transaction, a copy of the file may be stored with a new name, and a path where the new file is stored may be logged in a backup file section of the transaction log 116. If a rollback is performed then the file path in the created files list may be deleted, and/or backup files may be restored to their original names and locations.

After a transaction has been successful executed and logged, TMS 102 may flush any remaining transaction information from memory or storage, or otherwise mark it for garbage collection, and the transaction log 116 may be saved to disk. In an embodiment, TMS 102 may maintain a pointer to the last transaction ID to be executed and/or committed, which may be updated.

Figure 2:
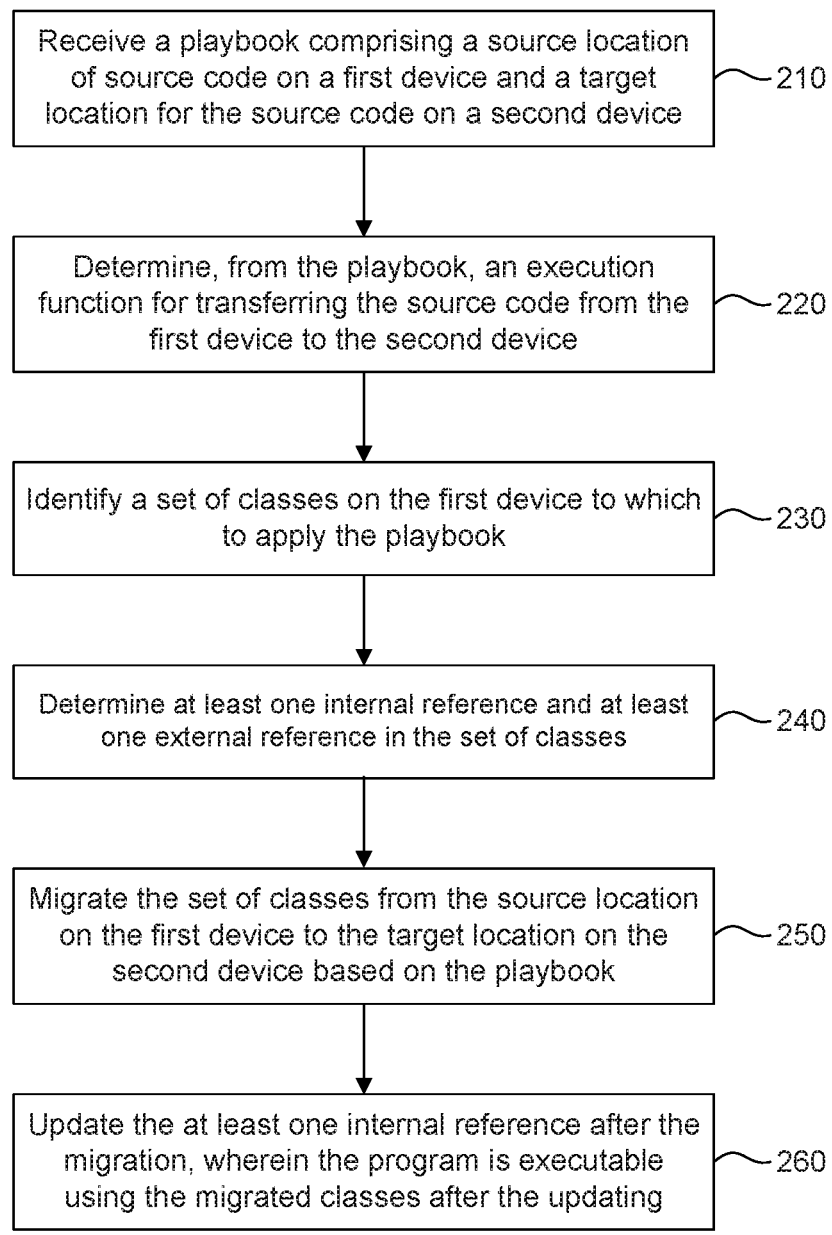
FIG. 2 is a flowchart illustrating example operations of a system for migrating code from a first device to a second device, according to some embodiments.

FIG. 2 is a flowchart 200 illustrating example operations of a system for migrating code from a first device to a second device, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 200 is not limited to the example embodiments.

In 210, a playbook comprising a source location of source code on a first device and a target location for the source code on a second device is received. For example, TMS 102 may determine source 114A and target 114B from a playbook 112. Playbook 112 may include developer provided indications as to which classes 110 of program 104 are being migrated during a current execution time.

In 220, an execution function for transferring the source code from the first device to the second device is determined. For example, a developer or user may identify an execution mode 118 against which to execute playbook 112. Example execution modes include copy, update, and move. In an embodiment, TMS 102 may reused the same playbook 112 in various execution modes 118.

In 230, a set of classes on the first device to which to apply the playbook are identified. For example, TMS 102 may identify from source 114A of playbook 112 that classes 110A and 110B are to be migrated to one or more different target devices 108, or different locations on source device 106.

In 240, at least one internal reference and at least one external reference in the set of classes are determined. For example, from configuration file 122, TMS 102 may identify that class 110D includes an external reference 120A to a device, software module, class, executable, or program code that is currently being migrated. TMS 102 may also identify that class 110B includes an internal reference 120B to class 110A that is currently being migrated via the execution of playbook 112.

In 250, the set of classes are migrated from the source location on the first device to the target location on the second device based on the playbook. For example, TMS 102 may execute the move, copy, or update command issued as part of execution mode 118 and migrate the classes in accordance with playbook 112.

In 260, the at least one internal reference is updated after the migration. For example, if execution mode 118 includes an update command, the internal reference 120B may be updated to point to the new location of class 110A on target device 108, as indicated within playbook 112. Further, any other references 120 in non-migrated classes to either class 110A or 110B may also be updated. In another embodiment, instead of or in addition to an internal reference 120B being updated, an external reference 120A may be updated. In other embodiments, no references 120 may exist or may need to updated after the migration.

In an embodiment, after the references 120 are updated, program 104 may be executable using the migrated classes 110A, 110B and the non-migrated classes 110C, 110D. In another embodiment, a user or developer may wait until all the classes 110 have been migrated prior to executing the program 104. In an embodiment, the post-migration execution may require another compilation of the distributed or migrated program classes 110.

Figure 3:
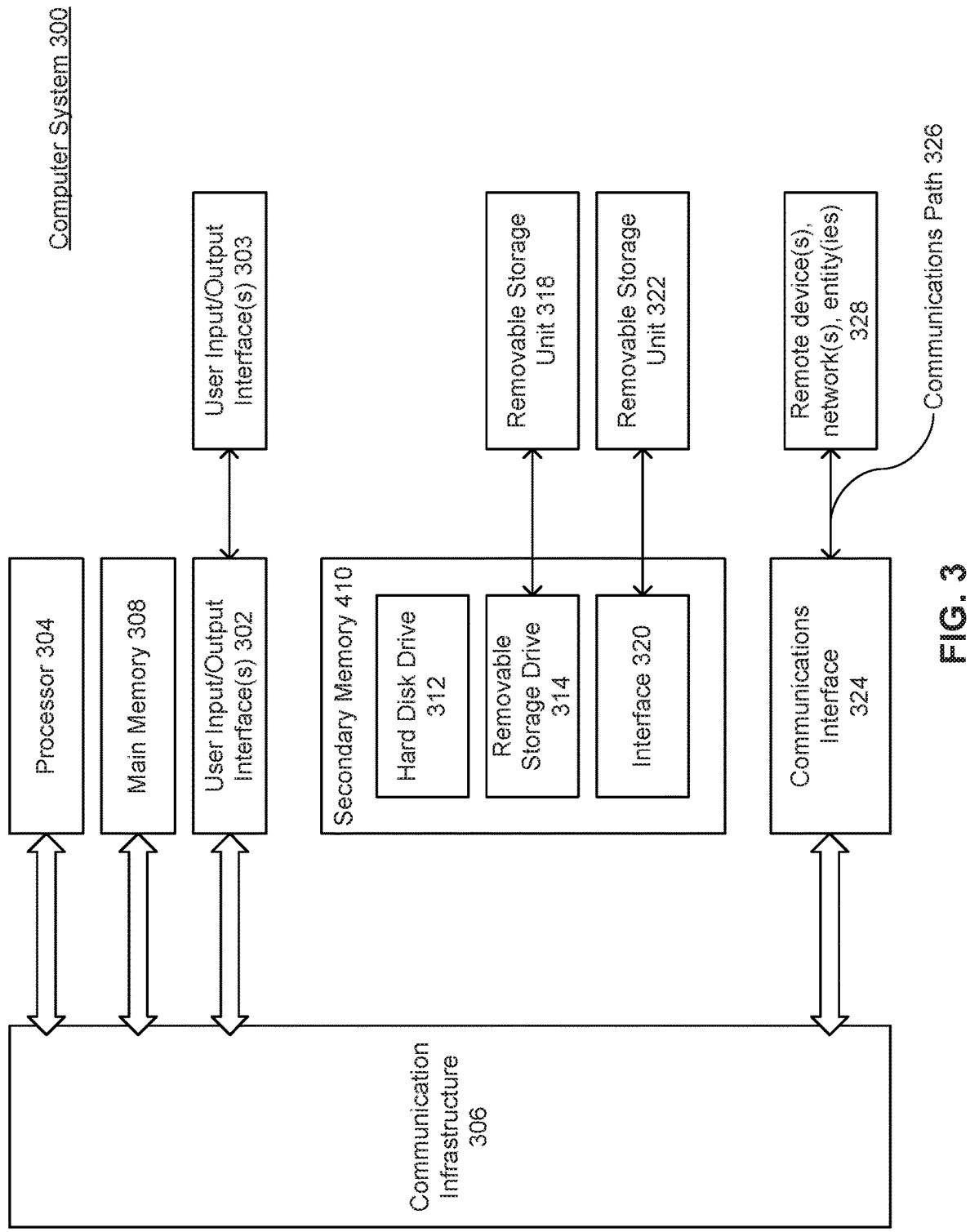
FIG. 3 is example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include customer input/output device(s) 303, such as monitors, keyboards, pointing devices, etc., which may communicate with communication infrastructure 306 through customer input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for migrating a program from a first device to a second device comprising:
   receiving a playbook comprising a source location of source code on the first device and a target location for the source code on the second device;
   determining, from the playbook, an execution function for transferring the source code from the first device to the second device;
   identifying a set of classes on the first device to which to apply the playbook;
   determining at least one internal reference and at least one external reference in the set of classes;
   migrating the set of classes from the source location on the first device to the target location on the second device based on the playbook; and
   updating the at least one internal reference after the migration, wherein the program is executable using the migrated set of classes after the updating.

2. The method of claim 1, wherein the at least one internal reference comprises a reference to one of the migrated set of classes.

3. The method of claim 1, wherein the execution function comprises one of a copy function or a move function.

4. The method of claim 1, wherein the execution function comprises a user-defined function.

5. The method of claim 1, wherein the playbook comprises one or more transactions that are executed and stored in a transaction log.

6. The method of claim 1, further comprising:
   determining that the at least one external reference references a migrated class of the source code from a non-migrated class of the source code; and
   updating the external reference in the migrated set of classes to the different location based on the subsequent migration.

7. The method of claim 6, further comprising:
   determining that during a subsequent migration the non-migrated class corresponding to the external reference is migrated from the source device to a different location.

8. A system comprising:
   a memory; and
   at least one processor coupled to the memory and configured to perform operations for migrating a program from a first device to a second device, the operations comprising:
   receiving a playbook comprising a source location of source code on the first device and a target location for the source code on the second device;
   determining, from the playbook, an execution function for transferring the source code from the first device to the second device;
   identifying a set of classes on the first device to which to apply the playbook;
   determining at least one internal reference and at least one external reference in the set of classes;
   migrating the set of classes from the source location on the first device to the target location on the second device based on the playbook; and
   updating the at least one internal reference after the migration, wherein the program is executable using the migrated classes after the updating.

9. The system of claim 8, wherein the at least one internal reference comprises a reference to one of the migrated set of classes.

10. The system of claim 8, wherein the execution function comprises one of a copy function or a move function.

11. The system of claim 8, wherein the execution function comprises a user-defined function.

12. The system of claim 8, wherein the playbook comprises one or more transactions that are executed and stored in a transaction log.

13. The system of claim 8, the operations further comprising:
    determining that the at least one external reference references a migrated class of the source code from a non-migrated class of the source code; and
    updating the external reference in the migrated set of classes to the different location based on the subsequent migration.

14. The system of claim 13, the operations further comprising:
    determining that during a subsequent migration the non-migrated class corresponding to the external reference is migrated from the source device to a different location.

15. A non-transitory computer-readable device having instructions stored thereon that, when executed by at least one computing device, cause the at least one computing device to perform operations to migrate a program from a first device to a second device, the operations comprising:
    receiving a playbook comprising a source location of source code on the first device and a target location for the source code on the second device;
    determining, from the playbook, an execution function for transferring the source code from the first device to the second device;
    identifying a set of classes on the first device to which to apply the playbook;
    determining at least one internal reference and at least one external reference in the set of classes;
    migrating the set of classes from the source location on the first device to the target location on the second device based on the playbook;
    updating the at least one internal reference after the migration, wherein the program is executable using the migrated classes after the updating.

16. The device of claim 15, wherein the at least one internal reference comprises a reference to one of the migrated set of classes.

17. The device of claim 15, wherein the execution function comprises one of a copy function or a move function.

18. The device of claim 15, wherein the execution function comprises a user-defined function.

19. The device of claim 15, wherein the playbook comprises one or more transactions that are executed and stored in a transaction log.

20. The device of claim 15, the operations further comprising:
    determining that the at least one external reference references a migrated class of the source code from a non-migrated class of the source code; and
    updating the external reference in the migrated set of classes to the different location based on the subsequent migration.

* * * * *